US010081558B2

(12) United States Patent
Fehring, Sr. et al.

(10) Patent No.: US 10,081,558 B2
(45) Date of Patent: Sep. 25, 2018

(54) UV LIGHT DISINFECTION AND POST-AERATION DEVICE FOR A WASTEWATER TREATMENT SYSTEM

(71) Applicant: FLOW2, LLC, Franklin, OH (US)

(72) Inventors: Mark Fehring, Sr., Cincinnati, OH (US); Mark Fehring, Jr., Fairfield, OH (US); Michael Fehring, Hamilton, OH (US); Jeff Coomer, Union, OH (US); Jeff Luthman, Moraine, OH (US)

(73) Assignee: FLOW2, LLC, Franklin, OH (US)

( * ) Notice: Subject to any disclaimer, the term of this patent is extended or adjusted under 35 U.S.C. 154(b) by 434 days.

(21) Appl. No.: 14/933,608

(22) Filed: Nov. 5, 2015

(65) Prior Publication Data

US 2017/0129787 A1     May 11, 2017

(51) Int. Cl.
*C02F 1/32*     (2006.01)
*C02F 1/72*     (2006.01)

(52) U.S. Cl.
CPC .............. *C02F 1/325* (2013.01); *C02F 1/72* (2013.01); *C02F 2201/3222* (2013.01); *C02F 2201/3228* (2013.01); *C02F 2303/04* (2013.01)

(58) Field of Classification Search
CPC .......... B01F 3/0473; C02F 1/325; C02F 3/04; C02F 3/24; C02F 3/2886; C02F 3/301; C02F 3/302; C02F 2201/328; C02F 1/4674; C02F 1/78; C02F 1/32; C02F 2103/42; Y10S 210/903; Y02W 10/15
See application file for complete search history.

(56) References Cited

U.S. PATENT DOCUMENTS

| | | | | |
|---|---|---|---|---|
| 5,352,357 A | * | 10/1994 | Perry | ................ B01F 3/0473 |
| | | | | 210/150 |
| 7,186,334 B1 | * | 3/2007 | Barnes | ................ C02F 1/4674 |
| | | | | 210/192 |
| 7,241,380 B2 | | 7/2007 | Reiling | |
| 7,279,092 B2 | | 10/2007 | Moody et al. | |
| 2006/0283793 A1 | | 12/2006 | Reiling | |
| 2010/0215553 A1 | * | 8/2010 | Byers | ................ C02F 1/325 |
| | | | | 422/186.3 |

* cited by examiner

*Primary Examiner* — Walter D. Griffin
*Assistant Examiner* — Cameron J Allen
(74) *Attorney, Agent, or Firm* — Porter, Wright, Morris & Arthur, LLP

(57) ABSTRACT

An ultraviolet disinfection device for a wastewater treatment system includes a tank having a tank inlet and a tank outlet, a treatment housing within the interior chamber and forming a treatment chamber, an ultraviolet light emitting device within the treatment chamber and emitting radiation having a disinfecting effect on bacteria, and a sample well disposed within the interior chamber and forming a well chamber. The tank forms an interior chamber so that effluent discharged from the wastewater treatment system and enters a tank inlet and flows into the interior chamber. Effluent within the interior chamber enters the treatment chamber through a housing inlet and flows past the ultraviolet light emitting device within the treatment chamber to a housing outlet. Disinfected effluent discharged from the housing outlet enters a well inlet and into the well chamber, and disinfected effluent within the well chamber flows through a well outlet to the tank outlet and is discharged from the tank through the tank outlet.

20 Claims, 7 Drawing Sheets

UV LIGHT DISINFECTION AND POST-AERATION DEVICE FOR A WASTEWATER TREATMENT SYSTEM

CROSS-REFERENCE TO RELATED APPLICATIONS

Not Applicable

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to wastewater treatment systems and methods and, more particularly, to such wastewater treatment systems and methods having ultraviolet light disinfection devices.

BACKGROUND OF THE INVENTION

Locations not served by municipal sewage systems and the like must utilize residential or commercial wastewater treatment systems to treat wastewater. Residential and commercial wastewater typically includes all kinds of particles and organisms, including bacteria such as *e coli* and viruses. As a result, at some locations, wastewater treatment must be followed by ultraviolet germicidal irradiation (UVGI). Ultraviolet germicidal irradiation (UVGI) is a disinfection method that utilizes ultraviolet (UV) light, particularly short-wavelength ultraviolet (UV-C) light, to kill and/or inactivate microorganisms by destroying nucleic acids and disrupting their DNA, leaving them unable to perform vital cellular functions.

UV light or energy is found in the electromagnetic spectrum between visible light and x-rays. In order to kill microorganisms, the UV light rays must strike the cells. Upon striking a cell, the UV energy penetrates the outer cell membrane, passes through the cell body and disrupts its DNA to prevent reproduction. Thus, the water is not altered chemically because nothing is added except for the UV energy. However, the sterilized microorganisms are not removed from the water and UV light disinfection does not remove dissolved organic or particles in the water. Thus, UV light disinfection should be used in conjunction with wastewater treatment means for biochemical oxygen demand (BOD) and total suspended solids (TSS) removal and reduction. As a result, wastewater treatment systems often include a primary treatment removing solids, fats, oils, greases etc., a secondary treatment degrading impurities such as anaerobic and/or aerobic filtration, and a tertiary treatment of disinfection such as by UV light.

The degree of inactivation by ultraviolet energy is directly related to the dose of UV applied to the water. The dosage, a product of UV light intensity and exposure time, is typically measured in microwatt second per square centimeter (uws/cm$^2$). Most UV disinfecting devices are designed to provide a dosage greater than 30,000 uWS/CM$^2$ after one year of continuous operation. Typically, UV disinfection devices for wastewater treatment systems utilize lamps that produce ultraviolet radiation at about 254 nm, which is the optimal wavelength for disinfection and ozone destruction. However, some ultrapure water treatment systems use ultraviolet radiation 185 nm for reducing total organic carbon (TOC).

While there are ultraviolet light disinfection products for wastewater treatment systems currently available on the market, these products may not be as durable, serviceable, and/or effective as desired. These current products are particularly not very effective flow rate is relatively high such as in some pumped wastewater treatment systems. Accordingly, there is a need in the art for improved ultraviolet light disinfection devices for wastewater treatment systems.

SUMMARY OF THE INVENTION

Disclosed are ultraviolet light disinfection devices for wastewater treatment systems that overcome at least one of the disadvantages of the prior art described above. Disclosed is an ultraviolet disinfection device for a wastewater treatment system comprising, in combination, a tank having a tank inlet and a tank outlet, a treatment housing disposed within the interior chamber and forming a treatment chamber, an ultraviolet light emitting device disposed within the treatment chamber and emitting radiation in a wavelength range having a disinfecting effect on bacteria within the effluent within the treatment chamber, and a sample well disposed within the interior chamber and forming a well chamber. The tank forms an interior chamber in fluid flow communication with the tank inlet so that effluent discharged from the wastewater treatment system and entering the tank inlet flows into the interior chamber. The treatment housing has a housing inlet in fluid flow communication with the interior chamber and the treatment chamber so that effluent within the interior chamber enters the treatment chamber through the housing inlet and flows past the ultraviolet light emitting device within the treatment chamber to a housing outlet in fluid flow communication with the treatment chamber. The sample well has a well inlet in fluid flow communication with the treatment housing outlet and the well chamber so that disinfected effluent discharged from the housing outlet enters the well inlet and into the well chamber, and a well outlet in fluid flow communication with the well chamber and the tank outlet so that disinfected effluent within the well chamber flows through the well outlet to the tank outlet and is discharged from the tank through the tank outlet.

Also disclosed is a wastewater treatment system comprising, in combination, a wastewater treatment device having an effluent outlet for discharging effluent, and an ultraviolet disinfection device downstream of the wastewater treatment device. The ultraviolet disinfection device comprises a tank having a tank inlet and a tank outlet, a treatment housing disposed within the interior chamber and forming a treatment chamber, an ultraviolet light emitting device disposed within the treatment chamber and emitting radiation in a wavelength range having a disinfecting effect on bacteria within the effluent within the treatment chamber, and a sample well disposed within the interior chamber and forming a well chamber. The tank inlet is in fluid flow communication with the effluent outlet of the wastewater treatment device. The tank forms an interior chamber in fluid flow communication with the tank inlet so that effluent discharged from the wastewater treatment system enters the tank inlet and flows into the interior chamber. The treatment housing has a housing inlet in fluid flow communication with the interior chamber and the treatment chamber so that effluent within the interior chamber enters the treatment chamber through the housing inlet and flows past the ultraviolet light emitting device within the treatment chamber to a housing outlet in fluid flow communication with the treatment chamber. The sample well has a well inlet in fluid flow communication with the treatment housing outlet and the well chamber so that disinfected effluent discharged from the housing outlet enters the well inlet and into the well chamber, and a well outlet in fluid flow communication with the well chamber and the tank outlet so that disinfected effluent within the well chamber flows through the well outlet to the tank outlet and is discharged from the tank through the tank outlet.

Also disclosed is method for treating wastewater comprising the steps of, in combination, flowing effluent discharged from a wastewater treatment device into a tank through a tank inlet of the tank to an interior chamber within the tank, flowing effluent from the interior chamber through a treatment chamber formed by a treatment housing within the tank from a housing inlet of the tank to a housing outlet of the tank, and disinfecting the effluent within the treatment chamber by flowing effluent past an ultraviolet light emitting device disposed within the treatment chamber and emitting radiation in a wavelength range having a disinfecting effect on bacteria. The method further comprises the steps of flowing disinfected effluent discharged from the housing outlet of the treatment housing through a well inlet of a sample well disposed within the interior chamber and into a well chamber formed by the sample well, and flowing disinfected effluent through a well outlet of the sample well to a tank outlet of the tank to discharge disinfected effluent from the tank.

From the foregoing disclosure and the following more detailed description of various preferred embodiments it will be apparent to those skilled in the art that the present invention provides a significant advance in the technology and art of ultraviolet light disinfection devices for wastewater treatment systems. Particularly significant in this regard is the potential the invention affords for a device that is relatively inexpensive, durable, serviceable, and effective at disinfecting waste water even at relatively high flow rates. Additional features and advantages of various preferred embodiments will be better understood in view of the detailed description provided below.

BRIEF DESCRIPTION OF THE DRAWINGS

These and further features of the present invention will be apparent with reference to the following description and drawing, wherein.

Figure 1:
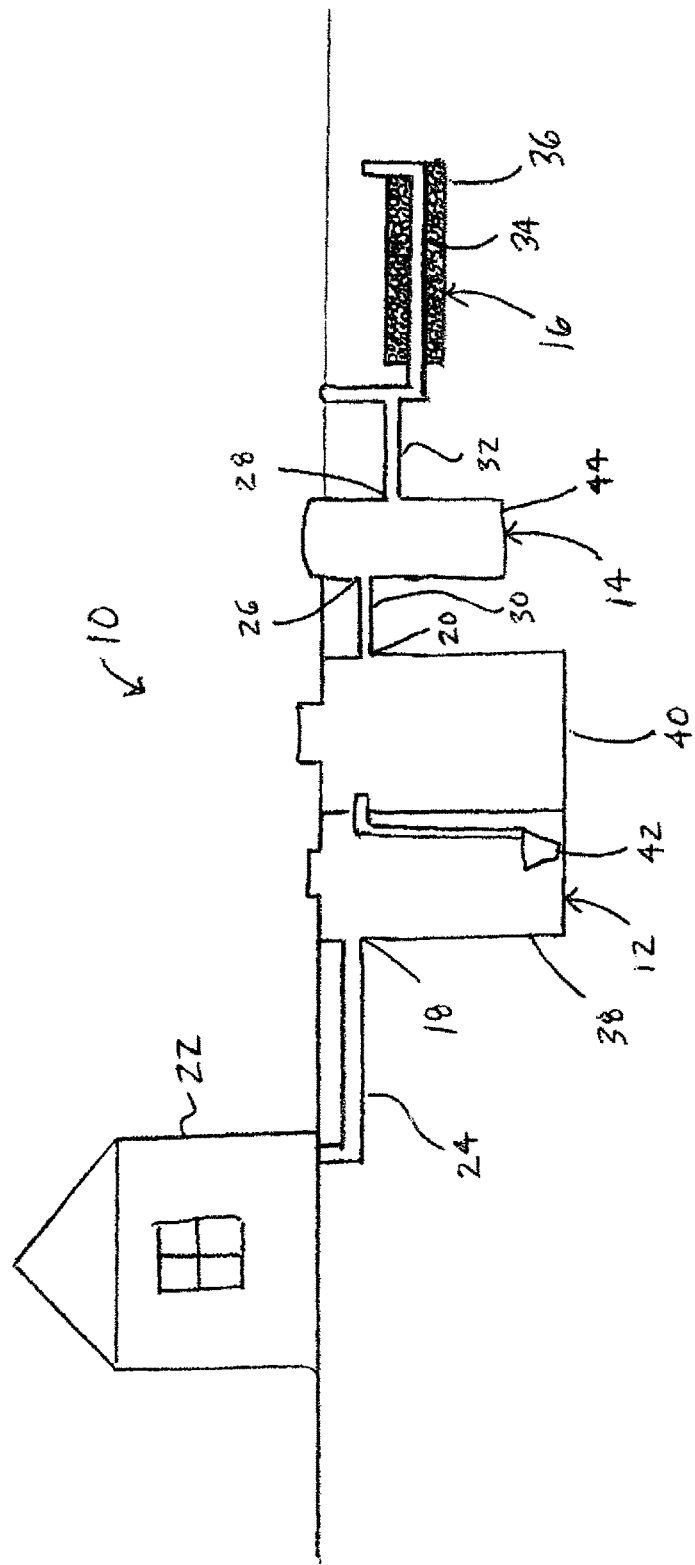
FIG. 1 is a schematic view of a wastewater treatment system having an UV light disinfection device according to present invention.

It should be understood that the appended drawings are not necessarily to scale, presenting a somewhat simplified representation of various preferred features illustrative of the basic principles of the invention. The specific design features of the ultraviolet light disinfection devices for wastewater treatment systems. As disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the vibration isolation systems illustrated in the drawings. In general, up or upward refers to an upward direction generally within the plane of the paper in FIG. 1 and down or downward refers to a downward direction generally within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved vibration isolation systems disclosed herein. The following detailed discussion of various alternative and preferred embodiments will illustrate the general principles of the invention with regard to the specific application of isolating a compressor from a cabinet of a residential air conditioning unit. Other embodiments suitable for other applications will be apparent to those skilled in the art given the benefit of this disclosure.

FIG. 1 illustrates an exemplary wastewater treatment system 10 according to the present invention. The illustrated wastewater treatment system 10 includes a wastewater treatment device 12 for treating wastewater influent, an ultraviolet (UV) disinfection device 14 located downstream of the wastewater treatment device 12 for disinfecting effluent discharged from the wastewater treatment device 12, and a drain field 16 located downstream of the ultraviolet disinfection device 12 at a discharge location for discharging the disinfected effluent to the environment. The illustrated wastewater treatment device 12, UV disinfection device 14, and drain field 16 are each located below ground surface except for access ports and the like but it is noted that any other suitable configuration can alternatively be utilized. The illustrated wastewater treatment device 12 has an influent inlet 18 for receiving wastewater influent and an effluent outlet 20 for discharging the effluent. The illustrated wastewater treatment device 12 receives the wastewater influent from a single-family dwelling or residence 22 via a sewer line or first conduit 24 in fluid flow communication with the influent inlet 18 of the wastewater treatment device 12. It is noted that while the wastewater influent is received from the single-family dwelling 22 the illustrated embodiment, the wastewater influent can alternatively be received from any other suitable producing of wastewater such as, for example, a multi-family dwelling, a commercial building or other type of non-dwelling building, and the like. The illustrated UV disinfection device 14 has a tank inlet 26 for receiving the effluent from the wastewater treatment device 12, and a tank outlet 28 for discharging disinfected effluent. The illustrated UV disinfection device 14 receives the effluent from the effluent outlet of the wastewater treatment device 12 via a second conduit 30 in fluid flow communication with the effluent outlet 20 of the wastewater treatment device 12 and the tank inlet of the UV disinfection device 14. The illustrated drain field 16 receives the disinfected effluent from the UV disinfection device 14 via a third conduit 32 in fluid flow communication with the tank outlet 28 of the UV disinfection device 14 and the drain field 16. The illustrated drain field 16 includes a plurality of perforated conduits or pipes 34 through which the disinfected effluent is discharged into a gravel-filled trench 36 from which the liquid enters the surrounding soil. It is noted that the drain field 16 can have any other suitable configuration or the disinfected effluent can be discharged in any other suitable manner such as, for example, to a seepage pit, dry well, a sand mound, surface discharged to a ditch, stream or the like, discharged for use in a water distribution system for further treatment and/or use, off-lot discharge such as ditch, storm sewer etc., and the like.

Figure 2:
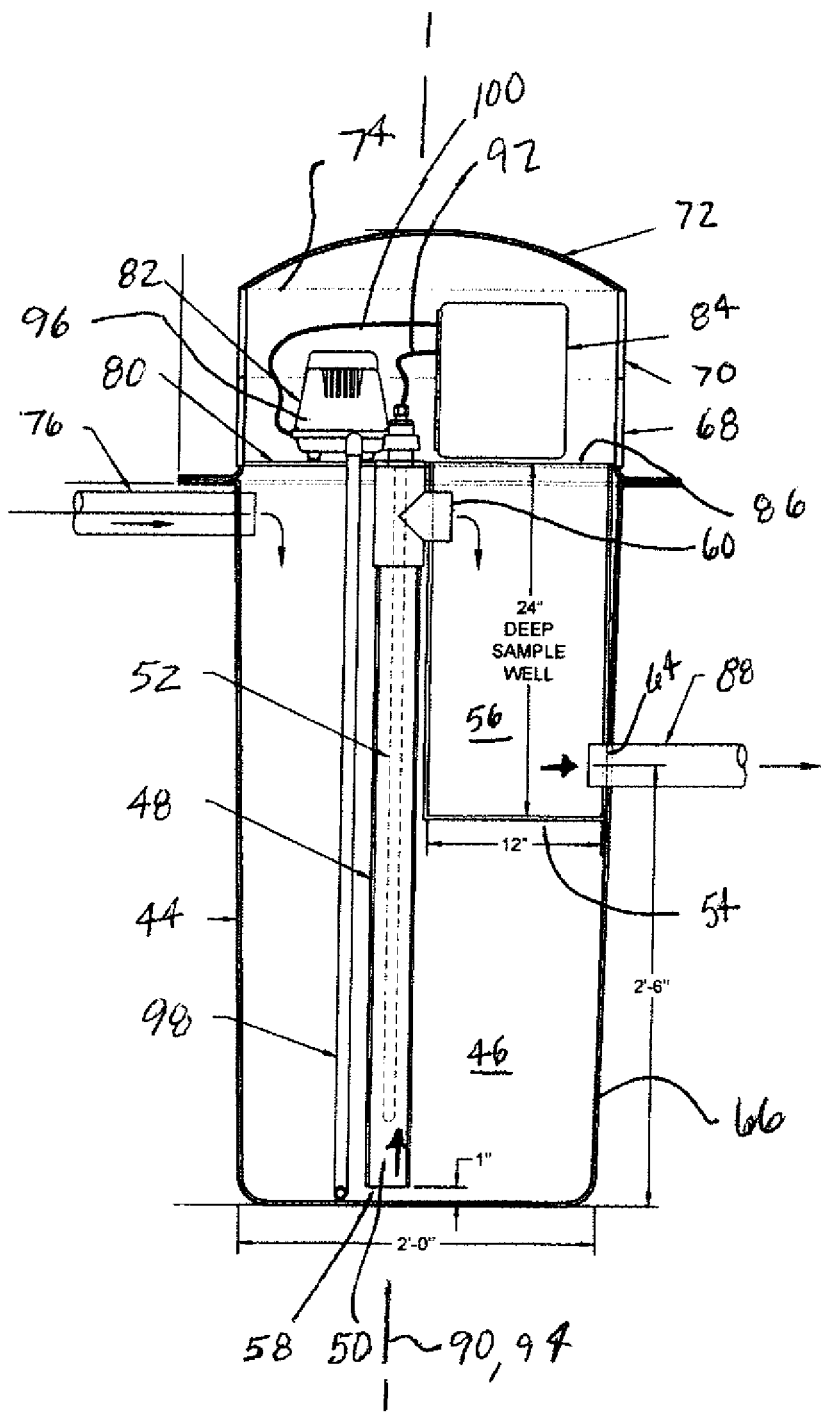
FIG. 2 is a front elevational view, partially in cross-section, of the UV light disinfection device of FIG. 1.
Figure 3:
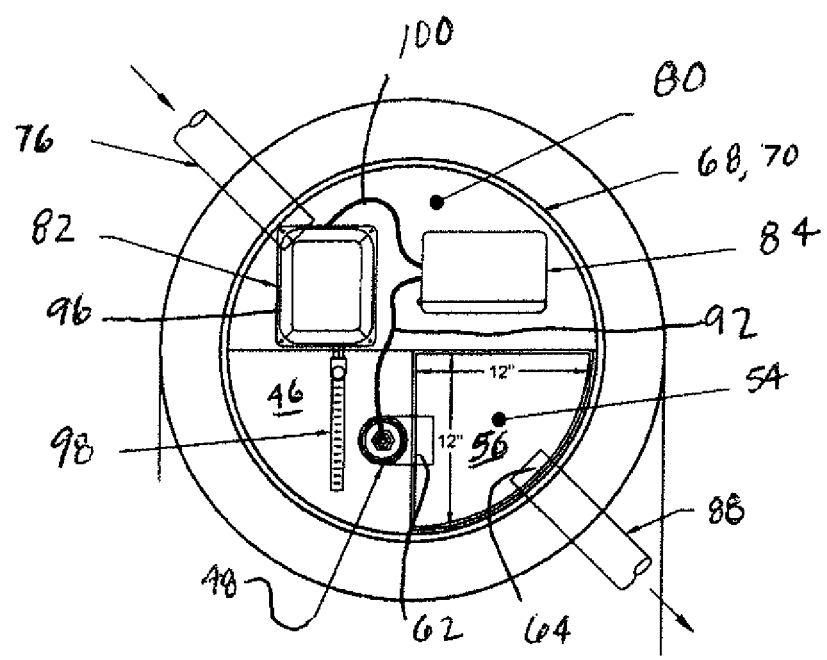
FIG. 3 is a top plan view, partially in cross-section, of the UV light disinfection device of FIGS. 1 and 2.
Figure 4:
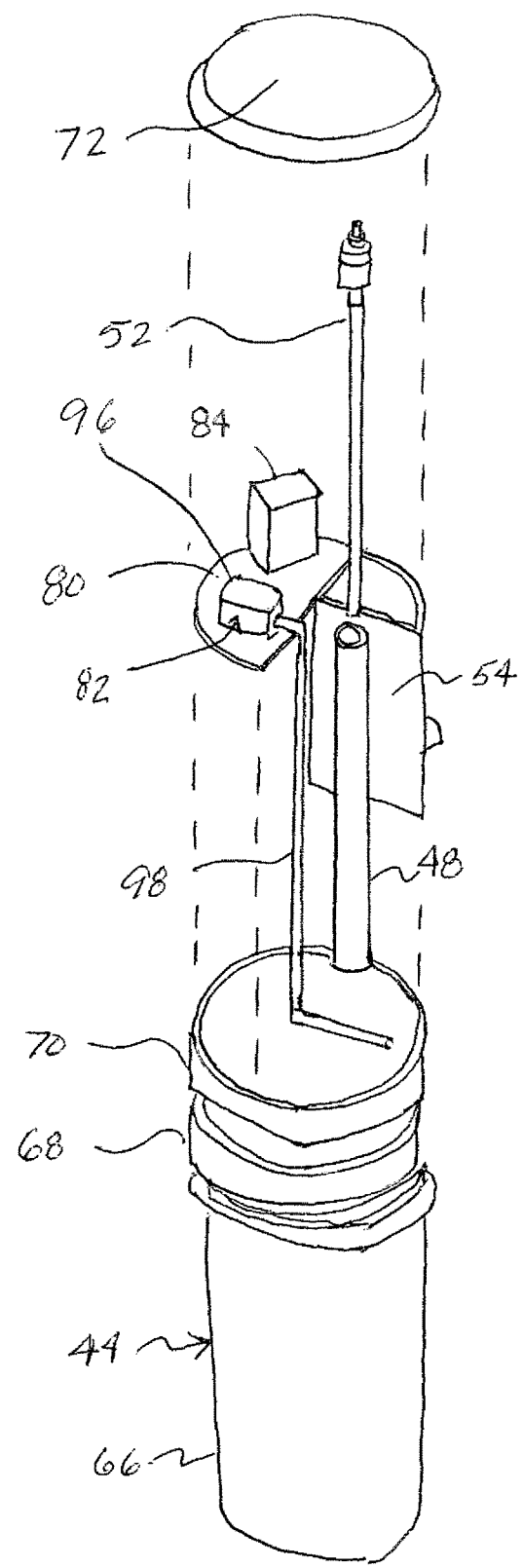
FIG. 4 is an exploded, perspective view of the UV light disinfection device of FIGS. 1 to 3.

As shown in FIGS. 2 to 4, the illustrated wastewater treatment device 12 is a multistage device having a first or pump tank or chamber 38 and a second treatment tank or chamber 40. The first tank or chamber 38 is provided with a pump with timer 40 to equalize flow of the wastewater to the second tank or chamber 40. The second tank or chamber 40 treats the wastewater by solids separation and aerobic treatment, or in any other suitable manner. It is noted that the wastewater treatment device 12 can alternatively be of any other suitable type such as, for example, a single stage device having a single tank or chamber, a multi-stage device having any suitable quantity of flow-equalization, pre-treatment, treatment, or post-treatment tanks or chambers, and the like. The wastewater treatment device 12 can be, for example, the NAYADIC wastewater treatment system, the MULTI-FLOW wastewater treatment system, or the EnviroGUARD wastewater treatment system, each available from Consolidated Treatment Systems, Inc. of Franklin, Ohio.

The illustrated UV disinfection device 14 includes a tank 44 having the tank inlet 26 and the tank outlet 28 and forming an interior chamber 46, a treatment housing 48 disposed within the interior chamber 46 and forming a treatment chamber 50, an ultraviolet (UV) light emitting device 52 disposed within the treatment chamber 50 and emitting radiation in a wavelength range having a disinfecting effect on bacteria within the effluent within the treatment chamber 50, and a sample well 54 disposed within the interior chamber 46 and forming a well chamber 56. The tank inlet 26 is in fluid flow communication with the effluent outlet 20 of the wastewater treatment device 12 and the tank interior chamber 46 so that effluent discharged from the wastewater treatment system 12 enters the tank inlet 26 and flows into the interior chamber 46. The treatment housing 48 has a housing inlet 58 in fluid flow communication with the interior chamber 46 and the treatment chamber 50 so that effluent within the interior chamber 46 enters the treatment chamber 50 through the housing inlet 58 and flows past the UV light emitting device 52 within the treatment chamber 50 to a housing outlet 60 in fluid flow communication with the treatment chamber 50. The sample well 54 has a well inlet 62 in fluid flow communication with the housing outlet 60 and the well chamber 56 so that disinfected effluent discharged from the housing outlet 60 enters the well inlet 62 and into the well chamber 56, and a well outlet 64 in fluid flow communication with the well chamber 56 and the tank outlet 28 so that disinfected effluent within the well chamber 56 flows through the well outlet 64 to the tank outlet 28 and is discharged from the tank 44 through the tank outlet 28.

The illustrated tank 44 is generally cylindrical-shaped and includes a tank body 66 having a closed bottom and top opening, first and second cylindrically-shaped risers 68, 70 supported on the top of the tank body 66 and each having top and bottom openings, and a removable top cover 72 selectively closing the open top of the second riser 70 that forms the tank top opening 74. The illustrated tank body 66 is cylindrical-shaped having a vertically extending central longitudinal axis, a side wall circular in cross section, and a bottom wall closing the lower end of the side wall so that the side and bottom walls form the interior chamber 46. A horizontally-extending flange outwardly extends from the side wall near the top edge of the side wall forming the top opening. The illustrated side wall has a diameter of about 2 feet, the illustrated flange has a diameter of about 2 feet and 10 inches, and the illustrated tank body 66 has a height of about four feet and 1 inch. Accordingly, the illustrated tank body 66 has an interior volume of about 105 gallons. The illustrated tank inlet 26 is a circular opening formed in the side wall near the top of the tank body 66 and the illustrated tank outlet 28 is a circular opening formed in the side wall about 180 degrees from the tank inlet 26. The illustrated tank inlet 26 is located about 3 feet and 11 inches from the bottom of the tank body 66 and the illustrated tank outlet 28 is located about 2 feet 11 inches from the bottom of the tank body 66. Thus, the illustrated tank inlet 26 is vertically located at a height above the tank outlet 28 by about 1 foot and 5 inches. The tank inlet 26 is sized and shaped to closely receive an inlet pipe 76 with a fluid-tight connection. It is noted that any other suitable configuration, shape, dimensions, and/or interior volume can alternatively be utilized. The illustrated tank body 66 is formed of fiberglass but any other suitable material can alternatively be utilized.

The illustrated first and second risers 68, 70 are each cylindrical-shaped have a side wall circular in cross section with the upper and lower edges of the sidewall forming top and bottom openings respectively. The illustrated first and second risers 68, 70 each have a diameter of about 2 feet and a height of about 6 inches so that the first riser 68 is supported on the top edge of the tank body sidewall and/or the tank body flange and the second riser 70 is supported on the top edge of the first riser 68. It is noted that any other suitable configuration, shape, and/or dimensions can alternatively be utilized. The illustrated first and second risers 68, 70 are each formed of a plastic but any other suitable material can alternatively be utilized.

The illustrated top cover 72 is generally dome shaped and is sized and shaped to close the top opening 74 of the second riser 70. The illustrated top cover 72 has a diameter of about 2 feet and a height of about 5 inches. The illustrated tank 44 has a total height of about 5 feet and 6 inches. It is noted that any other suitable shape and/or dimensions can alternatively be utilized. The illustrated top cover 72 is formed of a plastic but any other suitable material can alternatively be utilized.

Figure 5:
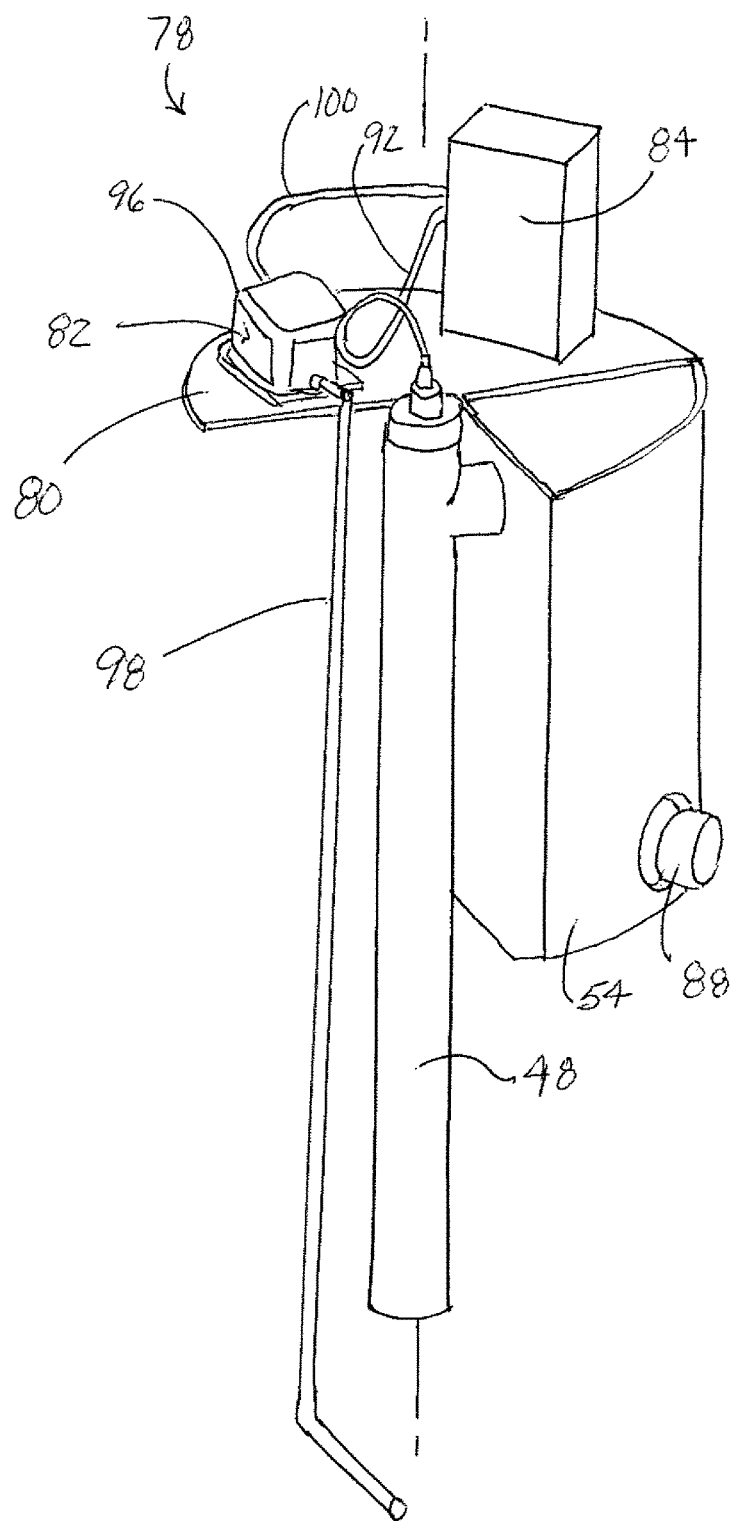
FIG. 5 is an enlarged, exploded, perspective view of a sample well assembly of the UV light disinfection device of FIGS. 1 to 4.

As shown in FIG. 5, the illustrated UV light disinfection device 15 includes a sample well assembly 78 sized and shaped to be inserted into and removed from the tank 44 through the first and second risers 68, 70 when the top cover 72 is removed. The illustrated sample well assembly 78 includes a shelf 80, the sample well 54, the treatment housing 48, the UV light emitting device 52, an aerator assembly 82, and a water-tight junction box 84. The illustrated shelf 80 has a substantially horizontal wall and a lip downwardly extending from the periphery of the wall. The shelf 80 is sized and shaped to be supported on the top edge of the tank body 66 with the lip outside the side wall of the tank body 66 and to cover about one half of the top opening of the tank body 66. Thus, the illustrated shelf 80 is generally semi-circular shaped. The illustrated shelf 80 has a diameter of about 2 feet and the illustrated lip has a height of about 1.5 inches. It is noted that any other suitable, configuration, shape, and/or dimensions can alternatively be utilized. The illustrated shelf 80 is formed of fiberglass but any other suitable material can alternatively be utilized.

The illustrated sample well 54 is sized and shaped to fit within one quadrant, or a quarter, of the cross-section of the tank body 66. The illustrated sample well 54 includes an arcuate outer wall having a diameter of about 12 inches and extending about 90 degrees, a pair of inner walls perpendicular to each other and extending from the side edges of the outer wall, and a bottom wall extending from bottom edges of the outer and inner walls and closing the bottom of the sample well to form the well chamber 56. Thus, the illustrated sample well 54 is generally quadrant shaped with an open top 86 located near the top opening of the tank body 66. Thus, a sample of disinfected effluent can be obtained from the sample well 54 through the first and second risers 68, 70 when the top cover 72 is removed. The illustrated sample well 54 has a height less than the height of the tank body 66 so that the bottom wall of the sample well 54 is spaced above the bottom wall of the tank body 66. The illustrated sample well 54 has a height about 2 feet so that the well chamber 56 has a height about one half of the height of the interior chamber 46 of the tank body 66. Thus the illustrated well chamber 56 has a volume of about one-eighth the volume of the interior chamber 46. The illustrated well inlet 62 is a circular opening formed in one of the inner walls and the illustrated well outlet 64 is a circular opening formed in the outer wall of the sample well 54. The illustrated well inlet 62 is vertically located at a height above the well outlet 64 by about 1 foot and 5 inches. The illustrated well outlet 64 is aligned and facing the tank outlet 28. The well outlet 64 and the tank outlet 28 are each sized and shaped to closely receive a discharge pipe 88 with fluid-tight connections. It is noted that any other suitable configuration, shape, and/or dimensions can alternatively be utilized. The illustrated sample well 54 is formed of fiberglass but any other suitable material can alternatively be utilized.

Figure 6:
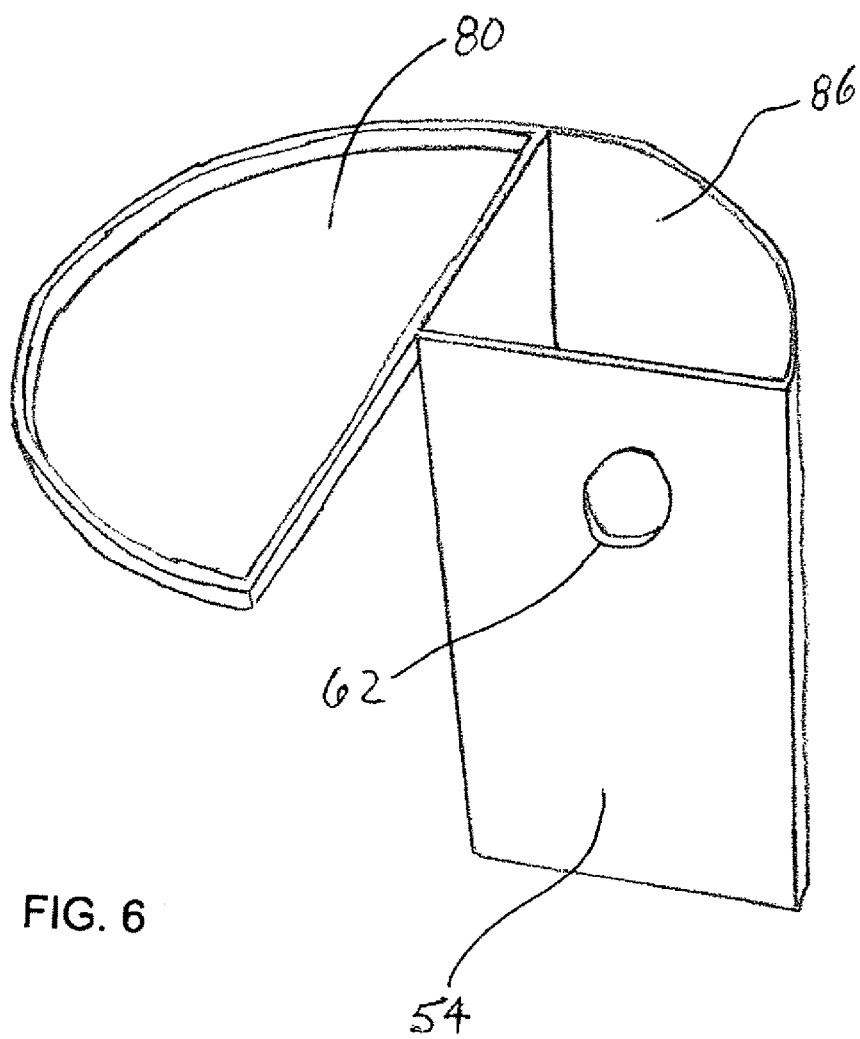
FIG. 6 is an enlarged, perspective view of a sample well of the sample well assembly of FIG. 5.

As shown in FIG. 6, the illustrated sample well 54 and the shelf 80 are formed as an integrated one-piece component. The illustrated sample well 54 extends down from one half of the inner edge of the shelf 80. Formed in this manner the sample well 54 downwardly extends from the shelf 54 and is entirely supported by the shelf 54 within the tank body 66. It is noted that any other suitable configuration can alternatively be utilized.

The illustrated UV or treatment housing 58 is disposed within the interior chamber 46 and forms the treatment chamber 50. The illustrated treatment housing 48 includes a vertically extending elongate body and a horizontally-extending outlet pipe extending from the elongate body near the top of the elongate body. The illustrated elongate body is in the form of a tube having a vertically-extending central axis 90 with a closed upper end and an open lower end. The open lower end forms the housing inlet 58. The outlet pipe perpendicularly extends from the elongate body and is in fluid communication with the outlet body and with the outlet pipe forming the housing outlet 60. The illustrated outlet pipe is sized and shaped to extend into the well inlet 62 with a fluid tight connection. The illustrated treatment housing 48 is entirely supported by the sample well 54 through the outlet pipe connection. The illustrated treatment housing 48 extends substantially the entire height of the interior chamber 46 so the housing inlet 58 is located near the bottom wall of the tank body 66. The illustrated housing inlet 58 is facing and spaced-apart from the bottom wall of the tank body 66 by about 1 inch. It is noted that any other suitable configuration, shape and/or dimensions can alternatively be utilized. The treatment housing 48 is preferably formed of a material that is not UV light transmissive and can have an interior surface that is substantially UV light reflective. The illustrated treatment housing 48 is formed of a PVC pipe but any other suitable material can alternatively be utilized.

The illustrated UV light emitting device 52 is an UV light lamp assembly having a base secured to and extending through the top wall of the treatment housing with a fluid-tight seal and an elongate bulb downwardly extending from the base within the treatment housing 48 so that the treatment housing 48 entirely supports the illustrated UV light emitting device 52. The base has an electric cable 92 upwardly extending therefrom that extends to the junction box 84. The illustrated elongate bulb has a vertically extending central axis 94 that is substantially coaxial with the central axis 90 of the treatment housing 48. The illustrated bulb is provided with a quartz protective sleeve so that the waste water contacts the quartz protective sleeve rather than the bulb. Configured in this manner, the wastewater upwardly travels through an annular-shaped space formed between the circular inner surface of the treatment housing and the circular outer surface of the quartz protective sleeve. It is noted that any other suitable configuration, shape and/or dimensions can alternatively be utilized.

The illustrated aerator assembly 82 includes an electric compressed-air blower assembly 96 for providing compressed air and a submerged air diffuser 98. The illustrated blower assembly 96 is a 20 LPM linear compressor but it is noted that any other suitable type or size of compressed air source can alternatively be utilized. The illustrated linear compressor is supported on the shelf 80 and has an electric cable 100 extending therefrom that extends to the junction box 84. The illustrated diffuser 98 includes a vertically extending main portion and a horizontally extending foot portion perpendicularly extending from the bottom of the main portion. The illustrated diffuser 98 is formed of a ½ inch diameter airline provided with an engineered diffuser having a plurality of perforations. The illustrated diffuser 98 is sized and shaped to extend from the linear compressor 96 to the bottom wall of the tank body 66 so that the foot portion engages the bottom wall of the tank body 66. Compressed air from the blower assembly 96 is delivered to the submerged air diffuser 98 located within the interior chamber 46 which disperses air in the form of air bubbles, which rise to the wastewater surface within the interior chamber 46. Aeration from the aerator assembly 82 transfers atmospheric oxygen into the wastewater and provides mixing of the wastewater. The aerator assembly 82 preferably enables the disinfected effluent discharged from wastewater treatment system 10 to have a dissolved oxygen minimum of 6 mg/L in order to meet the EPA requirement for off-lot discharge. It is noted that any other suitable configuration, shape and/or dimensions can alternatively be utilized. It is also noted that the aerator assembly 82 can be eliminated if desired.

The illustrated junction box 84 is a water-tight electric-cable junction box with cord grips for receiving the electric cables 92, 100 from the and the UV light emitting device 52 and the aerator assembly 82. The illustrated junction box 84 is supported on the shelf 80. It is noted that any other suitable configuration, shape and/or dimensions can alternatively be utilized.

The illustrated tank inlet 26 is located vertically higher than the housing inlet 58, the well outlet 64, and the tank outlet 28, the illustrated housing inlet 58 is located vertically lower than the housing outlet 60, the well inlet 62, the well outlet 64, and the tank outlet 28, the illustrated housing outlet 60 is located vertically higher than the well outlet 64 and the tank outlet 28, and the illustrated well inlet 62 is located vertically higher than the well outlet 64 and the tank outlet 28. Additionally, the illustrated tank inlet 26 is substantially at the same vertical height as the housing outlet 60 and the well inlet 62, and the illustrated tank outlet 28 is at substantially the same vertical height as the well outlet 64.

During operation of the UV disinfection device 14, effluent from the water treatment device 12 enters the interior chamber 46 of the tank 44 though the inlet pipe 76 and tank inlet 26. Within the interior chamber 46, the effluent is aerated and mixed by the aerator assembly 82. Effluent at the bottom of the interior chamber 46 enters the treatment housing 48 through the housing inlet 58 and upwardly flows through the treatment chamber 50 to the housing outlet 60. Within the treatment chamber 50, the effluent flows over the quartz protective sleeve of the UV lamp and receives UV light from the UV lamp to disinfect the effluent. The disinfected effluent travels horizontally through the housing outlet 60v and though the well inlet 62 into the sample well 54. Within the sample well 54, the disinfected effluent travels down and then horizontally out of the sample well 54 through the well outlet 64 and is discharged out of the tank 44 through the tank outlet 28 and the discharge pipe 88.

Figure 7:
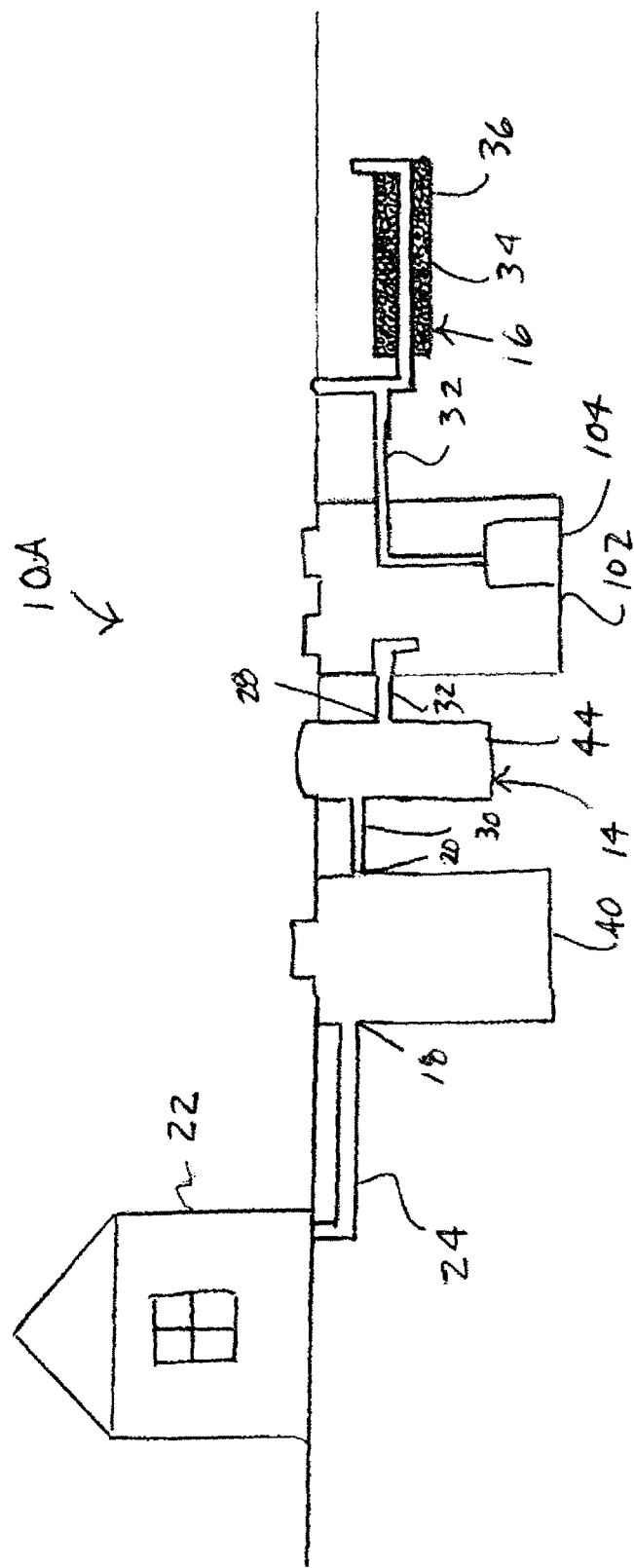
FIG. 7 is a schematic view of a wastewater treatment system, similar to FIG. 1 but of an alternative embodiment.

FIG. 7 illustrates a water treatment system 10A substantially the same as the water treatment system 10 of FIG. 1 except that the pump tank or chamber 38 upstream of the treatment tank or chamber 40 has been removed and a post-treatment pump tank or chamber 102 has been added downstream of the UV disinfection device 14. The pump tank or chamber 102 is provided with a pump 104 to control flow of the disinfected effluent out of the water treatment system 10A. Water received from the UV disinfection device 14 is stored in the pump tank or chamber 102 until the pump 104 is activated to discharge the water from the pump tank or chamber 102.

Any of the features or attributes of the above the above described embodiments and variations can be used in combination with any of the other features and attributes of the above described embodiments and variations as desired.

From the foregoing disclosure it will be apparent that the illustrated water treatment system according to the present invention provides an improved device that is relatively inexpensive, durable, serviceable, and effective at disinfecting waste water even at relatively high flow rates of at least 14 gallons per minute. It will also be apparent that because the UV disinfectant device is a separate device and within a separate housing from the wastewater treatment device, it can be incorporated into any existing wastewater treatment system and also provides numerous discharge options because the separate UV disinfectant device can be placed anywhere downstream of the wastewater treatment device such as, for example, it can be located up-slope to allow for gravity discharge.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An ultraviolet disinfection device for a wastewater treatment system, the ultraviolet disinfection device comprising, in combination:

a tank having a tank inlet and a tank outlet;

wherein the tank forms an interior chamber in fluid flow communication with the tank inlet so that effluent discharged from the wastewater treatment system and entering the tank inlet flows into the interior chamber;

an aerator assembly located within the tank and configured to disperse air in the form of air bubbles into the effluent within the interior chamber which rise to a surface of the effluent to aerate the effluent within the interior chamber;

a treatment housing disposed within the interior chamber and forming a treatment chamber;

an ultraviolet light emitting device disposed within the treatment chamber and emitting radiation in a wavelength range having a disinfecting effect on bacteria within the effluent within the treatment chamber;

wherein the treatment housing has a housing inlet in fluid flow communication with the interior chamber and the treatment chamber so that effluent within the interior chamber enters the treatment chamber through the housing inlet and flows past the ultraviolet light emitting device within the treatment chamber to a housing outlet in fluid flow communication with the treatment chamber;

a sample well disposed within the interior chamber and forming a well chamber for holding disinfected effluent discharged from the treatment housing separate from the effluent within the interior chamber that has not yet entered the treatment housing;

wherein the sample well has a well inlet in fluid flow communication with the treatment housing outlet and the well chamber so that the disinfected effluent discharged from the housing outlet enters the well inlet and into the well chamber, and a well outlet in fluid flow communication with the well chamber and the tank outlet so that the disinfected effluent within the well chamber flows through the well outlet to the tank outlet and is discharged from the tank through the tank outlet; and wherein the tank inlet is located vertically higher than the well outlet and the tank outlet, the well inlet is located vertically higher than the well outlet, and the housing inlet is located vertically lower than the well outlet.

2. The ultraviolet disinfection device according to claim 1, wherein the sample well has an open top within the tank.

3. The ultraviolet disinfection device according to claim 2, wherein the tank has a removable top cover selectively closing and opening a tank opening; and wherein the open top of the sample well is accessible through the tank opening.

4. The ultraviolet disinfection device according to claim 1, wherein the sample well supports the treatment housing and the ultraviolet light emitting device.

5. The ultraviolet disinfection device according to claim 1, wherein the treatment housing is elongate having a vertically-oriented longitudinal axis and the ultraviolet light emitting device is elongate having a vertically-oriented longitudinal axis coaxial with the longitudinal axis of the treatment housing, and the housing inlet is located vertically lower than the housing outlet so that effluent flows in a vertical direction past the ultraviolet light emitting device within the treatment chamber.

6. The ultraviolet disinfection device according to claim 1, wherein the tank inlet is located vertically higher than the housing inlet, the housing inlet is located vertically lower than the housing outlet, the well inlet, and the tank outlet, the housing outlet is located vertically higher than the well outlet and the tank outlet, and the well inlet is located vertically higher than the tank outlet.

7. An ultraviolet disinfection device for a wastewater treatment system, the ultraviolet disinfection device comprising, in combination:
a tank having a tank inlet and a tank outlet;
wherein the tank forms an interior chamber in fluid flow communication with the tank inlet so that effluent discharged from the wastewater treatment system and entering the tank inlet flows into the interior chamber;
a treatment housing disposed within the interior chamber and forming a treatment chamber;
an ultraviolet light emitting device disposed within the treatment chamber and emitting radiation in a wavelength range having a disinfecting effect on bacteria within the effluent within the treatment chamber;
wherein the treatment housing has a housing inlet in fluid flow communication with the interior chamber and the treatment chamber so that effluent within the interior chamber enters the treatment chamber through the housing inlet and flows past the ultraviolet light emitting device within the treatment chamber to a housing outlet in fluid flow communication with the treatment chamber;
a sample well disposed within the interior chamber and forming a well chamber;
wherein the sample well has a well inlet in fluid flow communication with the treatment housing outlet and the well chamber so that disinfected effluent discharged from the housing outlet enters the well inlet and into the well chamber, and a well outlet in fluid flow communication with the well chamber and the tank outlet so that disinfected effluent within the well chamber flows through the well outlet to the tank outlet and is discharged from the tank through the tank outlet; and
wherein a bottom of the well chamber is located vertically higher than a bottom of the interior chamber.

8. The ultraviolet disinfection device according to claim 7, further comprising an aerator assembly located within the tank and configured to disperse air in the form of air bubbles into the effluent within the interior chamber which rise to a surface of the effluent to aerate the effluent within the interior chamber.

9. An ultraviolet disinfection device for a wastewater treatment system, the ultraviolet disinfection device comprising, in combination:
a tank having a tank inlet and a tank outlet;
wherein the tank forms an interior chamber in fluid flow communication with the tank inlet so that effluent discharged from the wastewater treatment system and entering the tank inlet flows into the interior chamber;
a treatment housing disposed within the interior chamber and forming a treatment chamber;
an ultraviolet light emitting device disposed within the treatment chamber and emitting radiation in a wavelength range having a disinfecting effect on bacteria within the effluent within the treatment chamber;
wherein the treatment housing has a housing inlet in fluid flow communication with the interior chamber and the treatment chamber so that effluent within the interior chamber enters the treatment chamber through the housing inlet and flows past the ultraviolet light emitting device within the treatment chamber to a housing outlet in fluid flow communication with the treatment chamber;
a sample well disposed within the interior chamber and forming a well chamber;
wherein the sample well has a well inlet in fluid flow communication with the treatment housing outlet and the well chamber so that disinfected effluent discharged from the housing outlet enters the well inlet and into the well chamber, and a well outlet in fluid flow communication with the well chamber and the tank outlet so that disinfected effluent within the well chamber flows through the well outlet to the tank outlet and is discharged from the tank through the tank outlet; and
further comprising a shelf within the tank and partially supporting the sample well.

10. The ultraviolet disinfection device according to claim 9, further comprising an aerator assembly located within the tank and configured to disperse air in the form of air bubbles into the effluent within the interior chamber which rise to a surface of the effluent to aerate the effluent within the interior chamber.

11. A wastewater treatment system comprising, in combination:
a wastewater treatment device having an effluent outlet for discharging effluent;
an ultraviolet disinfection device downstream of the wastewater treatment device; and
wherein the ultraviolet disinfection device comprises:
a tank having a tank inlet and a tank outlet;
wherein the tank inlet is in fluid flow communication with the effluent outlet of the wastewater treatment device;
wherein the tank forms an interior chamber in fluid flow communication with the tank inlet so that effluent discharged from the wastewater treatment system enters the tank inlet and flows into the interior chamber;
an aerator assembly located within the tank and configured to disperse air in the form of air bubbles into the effluent located within the interior chamber which rise to a surface of the effluent to aerate the effluent within the interior chamber,
a treatment housing disposed within the interior chamber and forming a treatment chamber;
an ultraviolet light emitting device disposed within the treatment chamber and emitting radiation in a wavelength range having a disinfecting effect on bacteria within the effluent within the treatment chamber;
wherein the treatment housing has a housing inlet in fluid flow communication with the interior chamber and the treatment chamber so that effluent within the interior chamber enters the treatment chamber through the housing inlet and flows past the ultraviolet light emitting device within the treatment chamber to a housing outlet in fluid flow communication with the treatment chamber;

a sample well disposed within the interior chamber and
   forming a well chamber for holding disinfected
   effluent discharged from the treatment housing sepa-
   rate from the effluent within the interior chamber that
   has not yet entered the treatment housing;
wherein the sample well has a well inlet in fluid flow
   communication with the treatment housing outlet
   and the well chamber so that the disinfected effluent
   discharged from the housing outlet enters the well
   inlet and into the well chamber, and a well outlet in
   fluid flow communication with the well chamber and
   the tank outlet so that the disinfected effluent within
   the well chamber flows through the well outlet to the
   tank outlet and is discharged from the tank through
   the tank outlet; and
wherein the tank inlet is located vertically higher than
   the well outlet and the tank outlet, the well inlet is
   located vertically higher than the well outlet, and the
   housing inlet is located vertically lower than the well
   outlet.

12. The wastewater treatment system according to claim 11, wherein the sample well has an open top within the tank.

13. The wastewater treatment system according to claim 12, wherein the tank has a removable top cover selectively closing and opening a tank opening; and wherein the open top of the sample well is accessible through the tank opening.

14. The wastewater treatment system according to claim 11, A wastewater treatment system comprising, in combination:
   a wastewater treatment device having an effluent outlet for discharging effluent;
   an ultraviolet disinfection device downstream of the wastewater treatment device; and
   wherein the ultraviolet disinfection device comprises:
      a tank having a tank inlet and a tank outlet;
      wherein the tank inlet is in fluid flow communication with the effluent outlet of the wastewater treatment device;
      wherein the tank forms an interior chamber in fluid flow communication with the tank inlet so that effluent discharged from the wastewater treatment system enters the tank inlet and flows into the interior chamber;
      a treatment housing disposed within the interior chamber and forming a treatment chamber;
      an ultraviolet light emitting device disposed within the treatment chamber and emitting radiation in a wavelength range having a disinfecting effect on bacteria within the effluent within the treatment chamber;
      wherein the treatment housing has a housing inlet in fluid flow communication with the interior chamber and the treatment chamber so that effluent within the interior chamber enters the treatment chamber through the housing inlet and flows past the ultraviolet light emitting device within the treatment chamber to a housing outlet in fluid flow communication with the treatment chamber;
      a sample well disposed within the interior chamber and forming a well chamber;
      wherein the sample well has a well inlet in fluid flow communication with the treatment housing outlet and the well chamber so that disinfected effluent discharged from the housing outlet enters the well inlet and into the well chamber, and a well outlet in fluid flow communication with the well chamber and the tank outlet so that disinfected effluent within the well chamber flows through the well outlet to the tank outlet and is discharged from the tank through the tank outlet; and
   further comprising a shelf within the tank and partially supporting the sample well.

15. The ultraviolet disinfection device according to claim 14, further comprising an aerator assembly located within the tank and configured to disperse air in the form of air bubbles into the effluent within the interior chamber which rise to a surface of the effluent to aerate the effluent within the interior chamber.

16. The wastewater treatment system according to claim 11, wherein the sample well supports the treatment housing and the ultraviolet light emitting device.

17. The wastewater treatment system according to claim 11, wherein the treatment housing is elongate having a vertically-oriented longitudinal axis and the ultraviolet light emitting device is elongate having a vertically-oriented longitudinal axis coaxial with the longitudinal axis of the treatment housing, and the housing inlet is located vertically lower than the housing outlet so that effluent flows in a vertical direction past the ultraviolet light emitting device within the treatment chamber.

18. The wastewater treatment system according to claim 11, wherein the tank inlet is located vertically higher than the housing inlet, the housing inlet is located vertically lower than the housing outlet, the well inlet, and the tank outlet, the housing outlet is located vertically higher than the well outlet and the tank outlet, and the well inlet is located vertically higher than the well outlet and the tank outlet.

19. A wastewater treatment system comprising, in combination:
   a wastewater treatment device having an effluent outlet for discharging effluent;
   an ultraviolet disinfection device downstream of the wastewater treatment device; and
   wherein the ultraviolet disinfection device comprises:
      a tank having a tank inlet and a tank outlet;
      wherein the tank inlet is in fluid flow communication with the effluent outlet of the wastewater treatment device;
      wherein the tank forms an interior chamber in fluid flow communication with the tank inlet so that effluent discharged from the wastewater treatment system enters the tank inlet and flows into the interior chamber;
      a treatment housing disposed within the interior chamber and forming a treatment chamber;
      an ultraviolet light emitting device disposed within the treatment chamber and emitting radiation in a wavelength range having a disinfecting effect on bacteria within the effluent within the treatment chamber;
      wherein the treatment housing has a housing inlet in fluid flow communication with the interior chamber and the treatment chamber so that effluent within the interior chamber enters the treatment chamber through the housing inlet and flows past the ultraviolet light emitting device within the treatment chamber to a housing outlet in fluid flow communication with the treatment chamber;
      a sample well disposed within the interior chamber and forming a well chamber;
      wherein the sample well has a well inlet in fluid flow communication with the treatment housing outlet and the well chamber so that disinfected effluent discharged from the housing outlet enters the well inlet and into the well chamber, and a well outlet in fluid flow communication with the well chamber and the tank outlet so that disinfected effluent within the well chamber flows through the well outlet to the tank outlet and is discharged from the tank through the tank outlet; and wherein a bottom of the well chamber is located vertically higher than a bottom of the interior chamber.

20. The ultraviolet disinfection device according to claim 19, further comprising an aerator assembly located within the tank and configured to disperse air in the form of air bubbles into the effluent within the interior chamber which rise to a surface of the effluent to aerate the effluent within the interior chamber.

\* \* \* \* \*